UNITED STATES PATENT OFFICE.

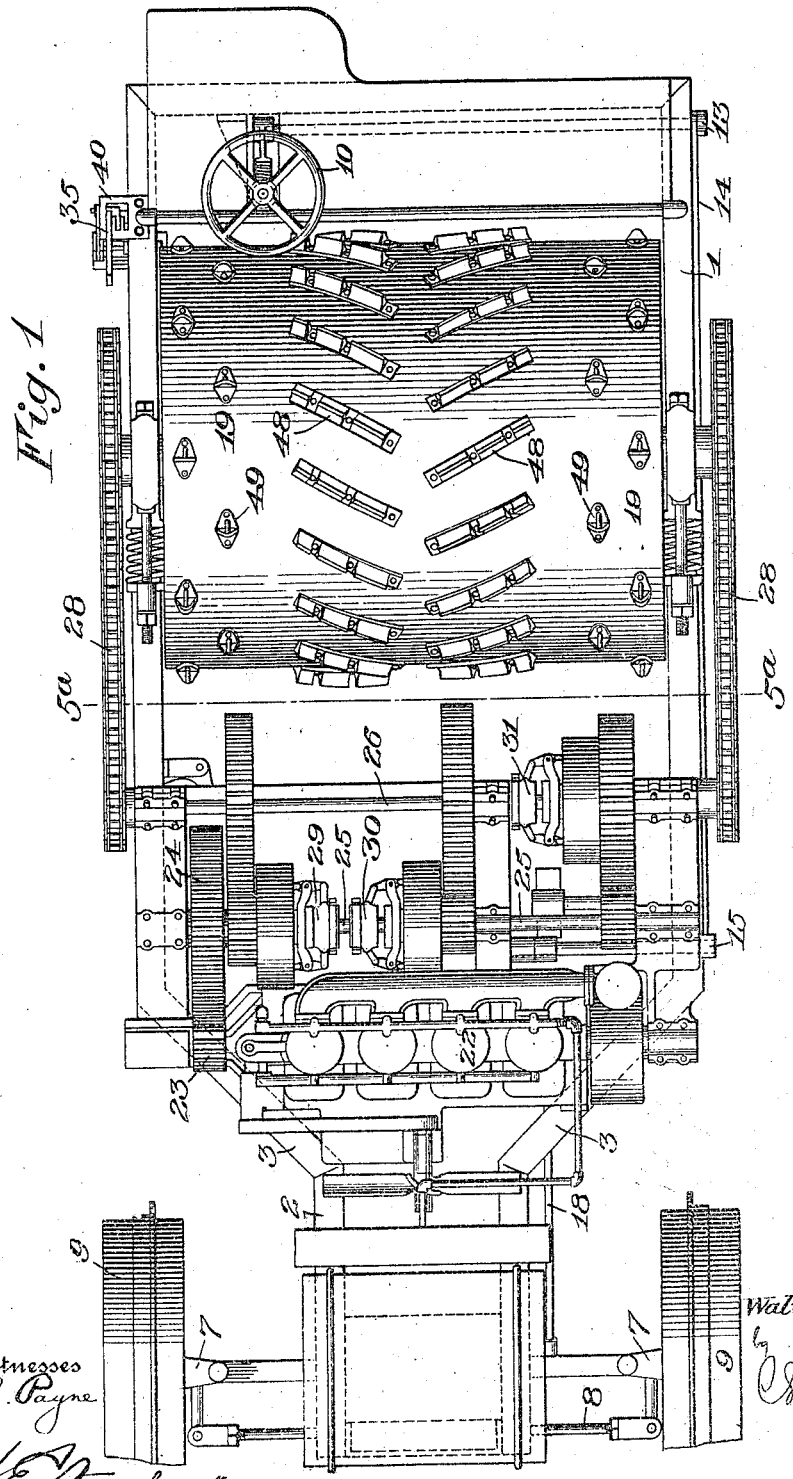

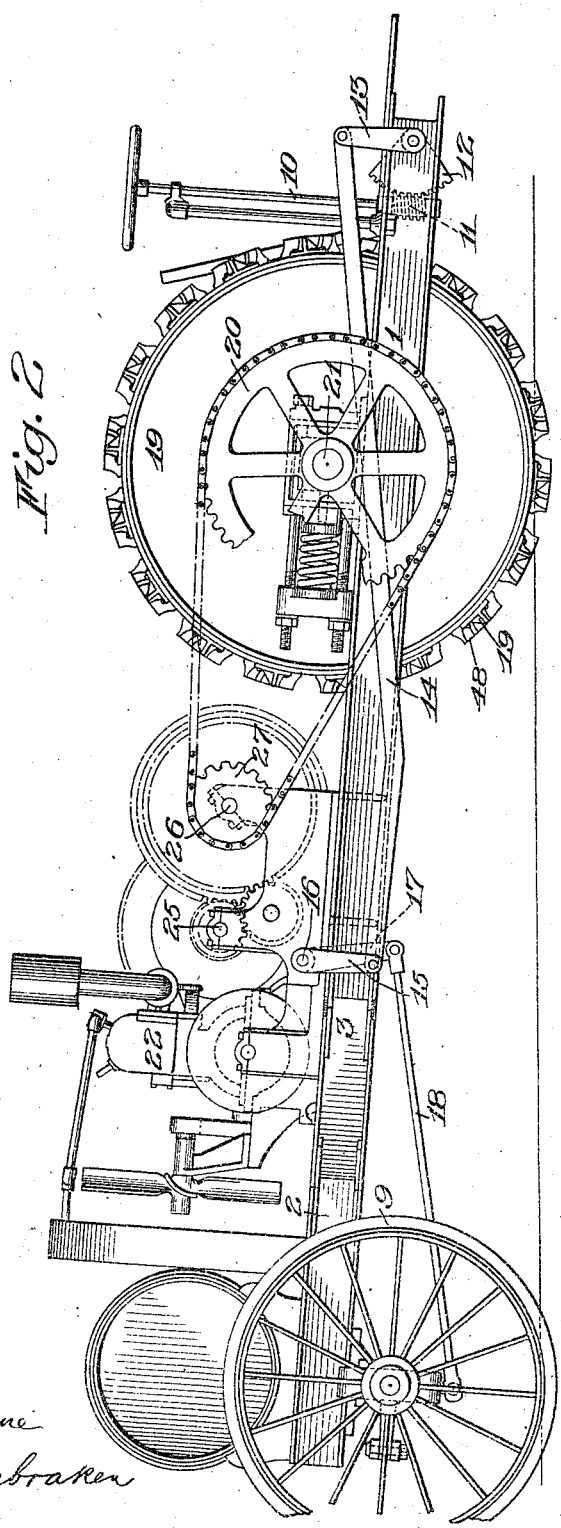

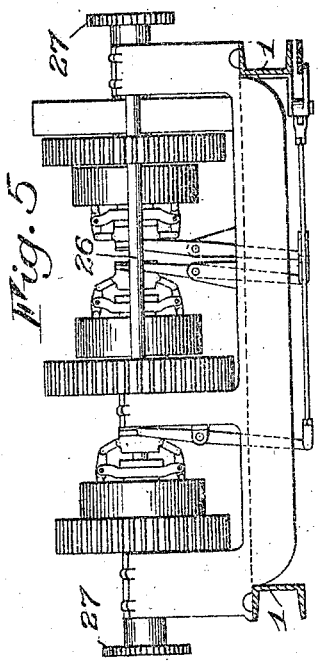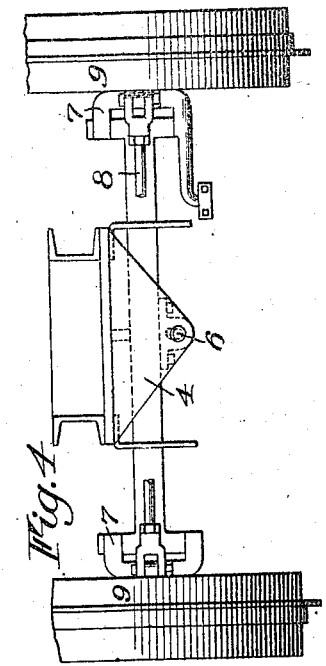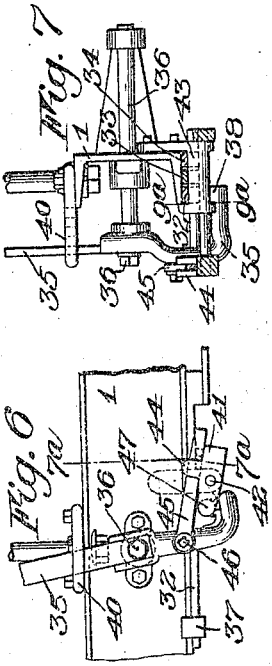

WALTER C. KNAPP, OF ROCHESTER, NEW YORK, ASSIGNOR, BY MESNE ASSIGNMENTS, TO JOSEPH W. GRAY, OF MINNEAPOLIS, MINNESOTA.

TRACTOR.

1,169,165.  Specification of Letters Patent.  Patented Jan. 25, 1916.

Application filed August 30, 1912. Serial No. 777,857.

*To all whom it may concern:*

Be it known that I, WALTER C. KNAPP, a citizen of the United States, of Rochester, in the county of Monroe and State of New York, have invented certain new and useful Improvements in Tractors; and I do hereby declare the following to be a full, clear, and exact description of the same, reference being had to the accompanying drawings, forming a part of this specification, and to the reference-numerals marked thereon.

The present invention relates to tractors, and it has for its object to provide a machine having a novel construction and arrangement for drawing plows, harrows, cultivators, and other farm implements, or doing any sort of farm or road work of this general character.

A further object of my invention consists in providing a machine having sufficient power to pull comparatively heavy loads, and to ascend steep grades against the obstructions that are usually to be encountered, while at the same time possessing sufficient strength and rigidity in all of its parts to withstand any strains to which it may be subjected.

Still another object of the invention is to afford a machine that can be readily controlled, and to so construct and arrange the driving wheel as to furnish a greatly increased pulling capacity by causing a firm, unyielding engagement between the wheel and the surface of the ground, irrespective of the character of the latter.

To these and other ends the invention consists in certain improvements and combinations of parts all as will be hereinafter more fully described, the novel features being pointed out in the claims at the end of the specification.

In the drawings: Figure 1 is a plan view of a machine constructed in accordance with a preferred embodiment of my invention; Fig. 2 is a side elevation of the same; Fig. 3 is a partial elevation of the bottom of the machine; Fig. 4 is a front elevation; Fig. 5 is a sectional view on the line 5ª—5ª of Fig. 1; Fig. 6 is a detail view in side elevation of the clutch controlling mechanism; Fig. 7 is a sectional view on the line 7ª—7ª of Fig. 6; Fig. 8 is a bottom plan view, and Fig. 9 is a sectional view on the line 9ª—9ª of Fig. 7.

Similar reference numerals throughout the several figures indicate the same parts.

I have shown my invention in one of its preferred embodiments, and in the drawings, 1 designates the frame formed preferably of channel iron, and having a reduced portion 2 at the front thereof, which is connected to the rear part of the frame by the angular portions 3. The reduced portion at the forward part of the frame carries downwardly extending plates 4 between which the axle 5 is mounted on a horizontal pivot 6. The axle 5 carries steering knuckles 7 which are connected by the rod 8. 9 are the steering wheels, which are controlled from the rear of the machine through the steering post 10, worm gear 11, gear segment 12, and arm 13 which is pivoted to the connecting rod 14. The latter is connected to an arm 15 rigidly mounted on a shaft 16 which carries a second arm 17, the latter being connected by the rod 18 to one of the steering knuckles, as usual in this class of machines.

The driving wheel is designated at 19, being journaled in the frame at the rear thereof and consisting of a single tread extending to points adjacent to the sides of the frame and having a width which is greater than the width of the reduced portion 2 at the front of the frame. The driving wheel is preferably of a width substantially equal to the distance between the steering wheels 9, and the best results are obtained when it is slightly wider than the distance between said steering wheels, as shown in the present embodiment, although I am not limited to the exact proportions shown, so long as I retain the essential feature of the driving wheel at the rear having a comparatively wide tread surface, preferably equal to or slightly greater than the distance between the steering wheels at the front of the frame.

The driving wheel is provided with a pair of sprocket wheels 20 arranged at the ends of the axle 21, and is preferably operated by an engine disposed between it and the reduced forward portion of the frame. The engine of the present embodiment comprises a four-cylinder explosive motor 22. The engine shaft carries a pinion 23 in engagement with a gear wheel 24 which is mounted on the transmission shaft 25, and 26 is a jack-shaft carrying sprocket wheels 27 which are connected with the sprocket wheels 20 by means of chains 28. Clutches 29 and 30 are provided, of any suitable construction, for controlling two forward speeds of the engine while the clutch 31 is arranged on the jack shaft 26 to control the reverse movement of the machine, said clutches being operated through the clutch rods 32, 33, and 34 respectively. The clutch rods are arranged to be operated by a single controlling lever at the rear of the machine, which is designated at 35 and is pivotally mounted on the support 36. Said clutch rods are slidably supported on a strap 37 which is attached to the frame, and they may be alternately moved by the lever 35 through an actuating arm 38 carried thereby, in the manner that will now be described. The actuating arm 38 extends upwardly from the lever 35 at its lower end and is arranged to engage the notches 39 which are formed in the clutch rods as shown in Figs. 6 to 9 inclusive. The lever 35 is laterally slidable on the support 36 to enable the actuating arm 38 to engage either one of the notches 39, and is guided by the notched plate 40. When one of the clutch rods is being operated, it is desirable to lock the remaining clutch rods against movement, and to this end I provide a yoke 41 which carries a guide rod 42 that is laterally slidable on the frame in the guides 43. The yoke is provided on its upper side with ears 44 between which is engaged an arm 45, pivotally connected at 46 to the lower end of the lever 35, whereby the lateral movement of the lever 35 is imparted to the yoke 41 to effect a corresponding movement of the latter. The yoke 41 is provided with oppositely projecting locking arms 47 which are arranged in the plane of the notches 39 in the clutch rods and are so related to each other that when the actuating arm 38 is engaged with one of the clutch rods, the locking arms 47 of the yoke are in engagement with the notches of the remaining clutch rods and movement of the latter is thereby prevented.

The tread of the driving wheel is preferably provided at its central part with a plurality of elongated cleats 48 which are oppositely disposed, at an angle to the axis of the wheel, while 49 designate projections or teeth which are secured near the edges of the wheel, in staggered relation and spaced from the centrally disposed cleats 48. This arrangement affords an extremely efficient gripping surface for the driving wheel, and produces the necessary engagement with the surface of the ground to enable the machine to travel over most any kind of ground, and to draw the heaviest loads without any loss of power.

I claim as my invention:

1. A tractor comprising a frame, an axle and combined steering and rolling wheels at the front, and a driving wheel having a tread as wide as the distance between the front wheels, said driving wheel being journaled near the rear of the frame.

2. A tractor comprising an axle and combined steering and rolling wheels at the front, a frame having a reduced forward portion arranged intermediate said steering wheels and to which the axle is attached, a driving wheel having a tread as wide as the distance between the steering wheels, said driving wheel being journaled near the rear of the frame, an engine disposed on the frame between the driving wheel and the steering wheels an axle on which the driving wheel is mounted, a sprocket wheel attached to each end of the last mentioned axle, and transmission gearing connecting the engine and said sprocket wheels.

3. A tractor comprising a frame, an axle and combined steering and rolling wheels arranged at the forward part of the frame, a driving wheel disposed in rear of the steering wheels having a tread as wide as the distance between the steering wheels, said driving wheel being journaled in the frame at its widest part and having its edges adjacent to the sides of the frame, an engine between the steering wheels and the driving wheel, and transmission gearing connecting the engine and the driving wheel.

WALTER C. KNAPP.

Witnesses:
H. E. STONEBRAKER,
HENRY U. HALL.